F. SPALAZZI.
TACTICAL NAVAL TRACER.
APPLICATION FILED JUNE 17, 1911.

1,084,907.

Patented Jan. 20, 1914.
11 SHEETS—SHEET 1.

Fig. 1.

Witnesses:
Cornelius Hoving
R. P. Appleton

Inventor:
F. Spalazzi.
By
H. Van ——
Attorney

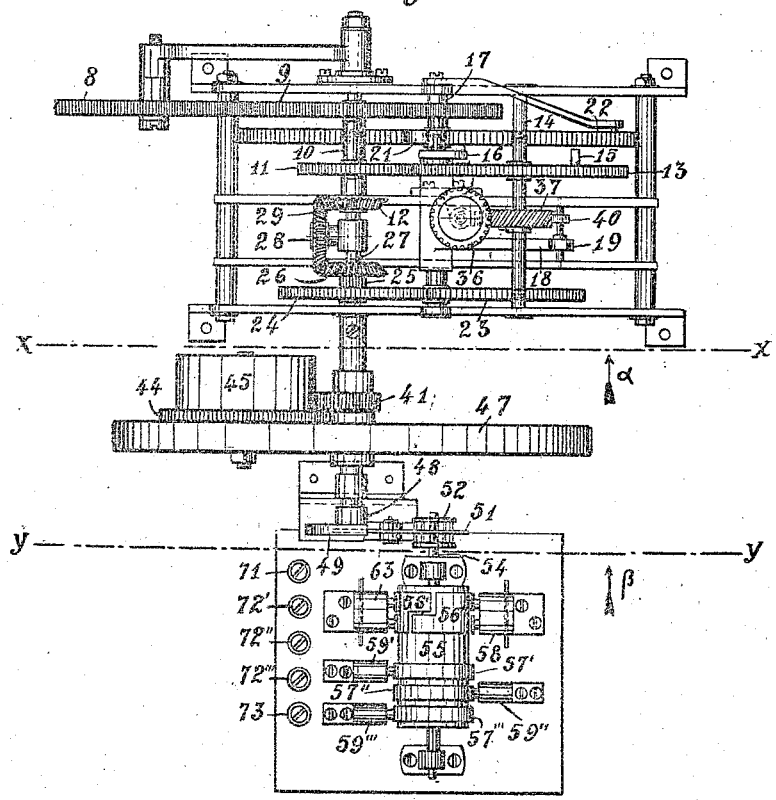

F. SPALAZZI.
TACTICAL NAVAL TRACER.
APPLICATION FILED JUNE 17, 1911.
1,084,907.
Patented Jan. 20, 1914.
11 SHEETS—SHEET 3.
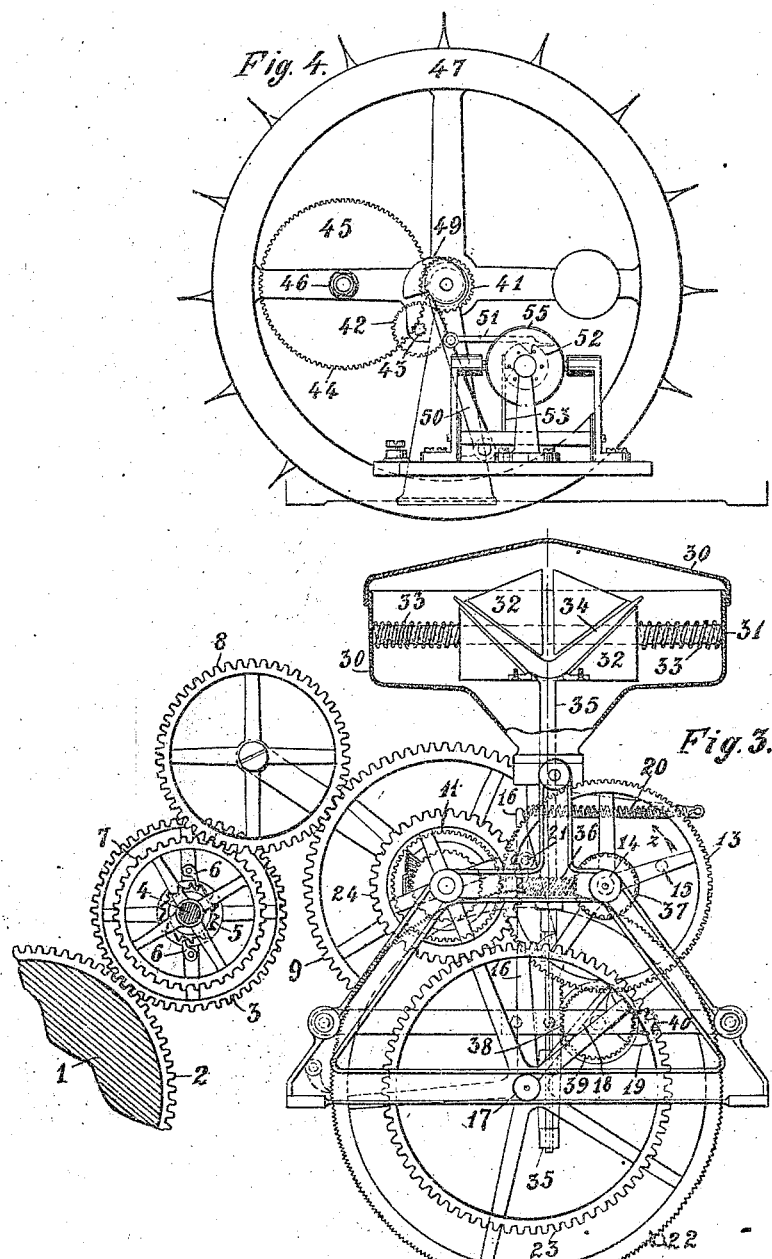
WITNESSES:
INVENTOR:
FRANCESCO SPALAZZI
By Attorney

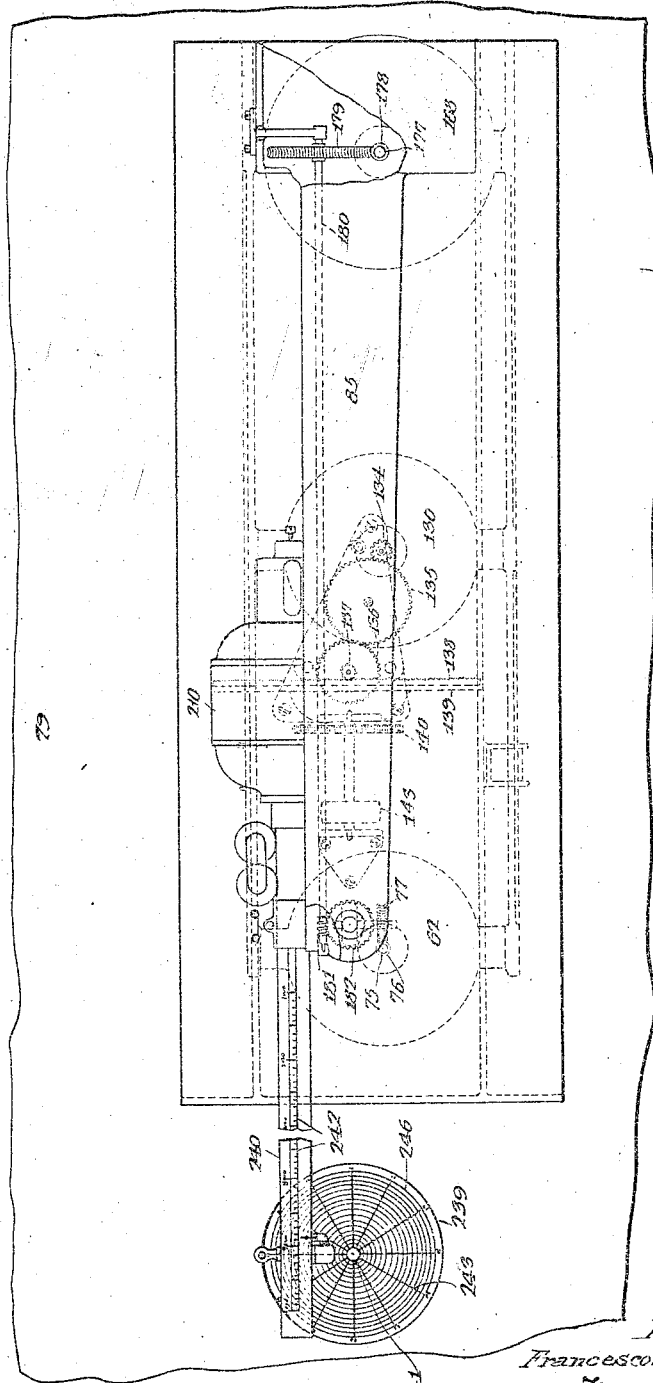

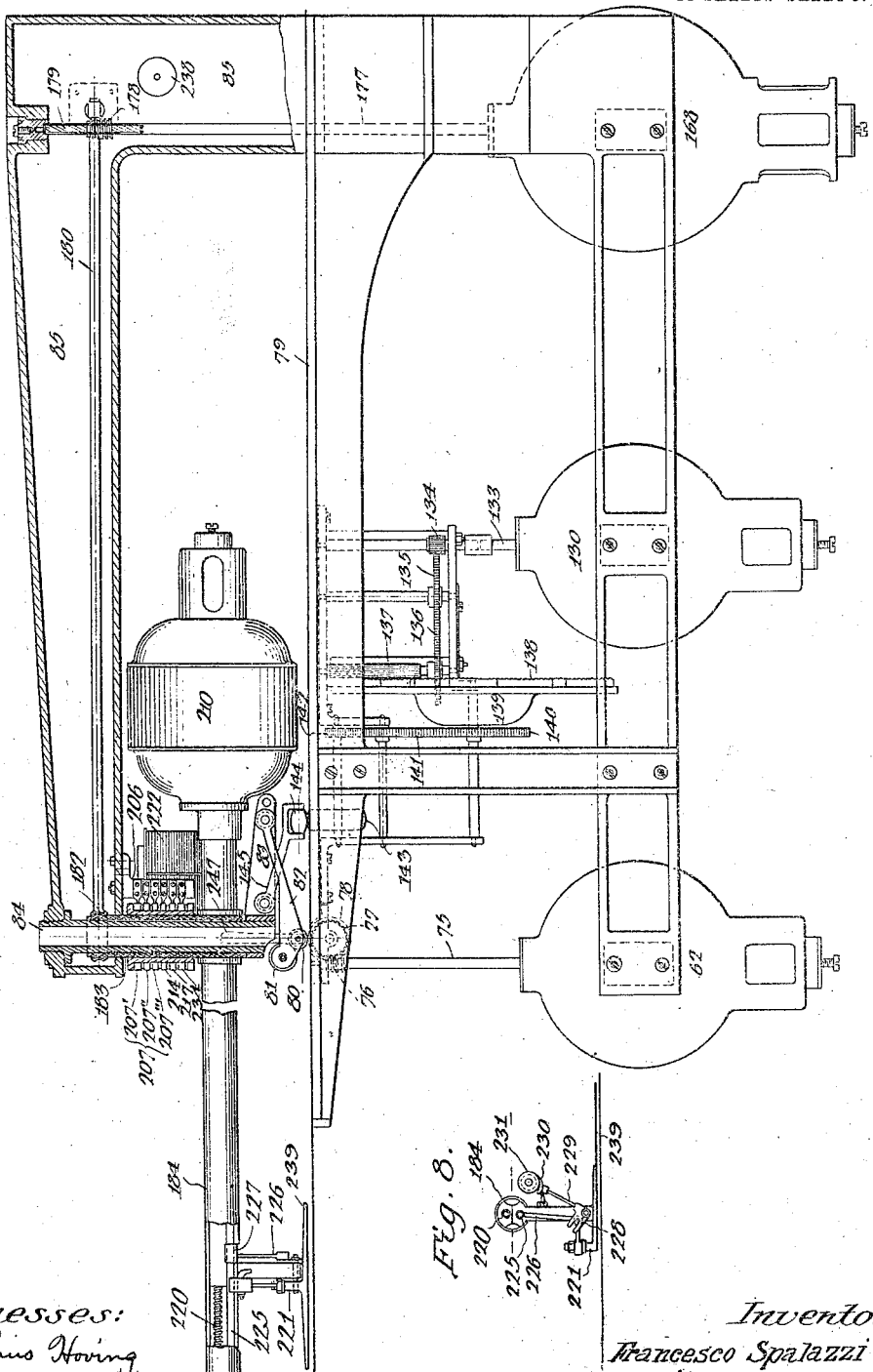

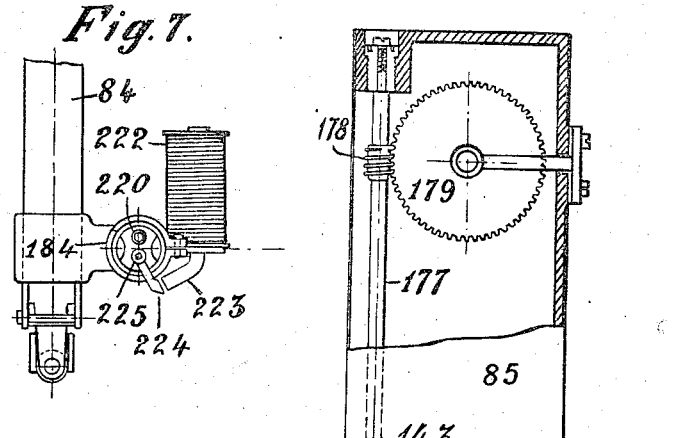
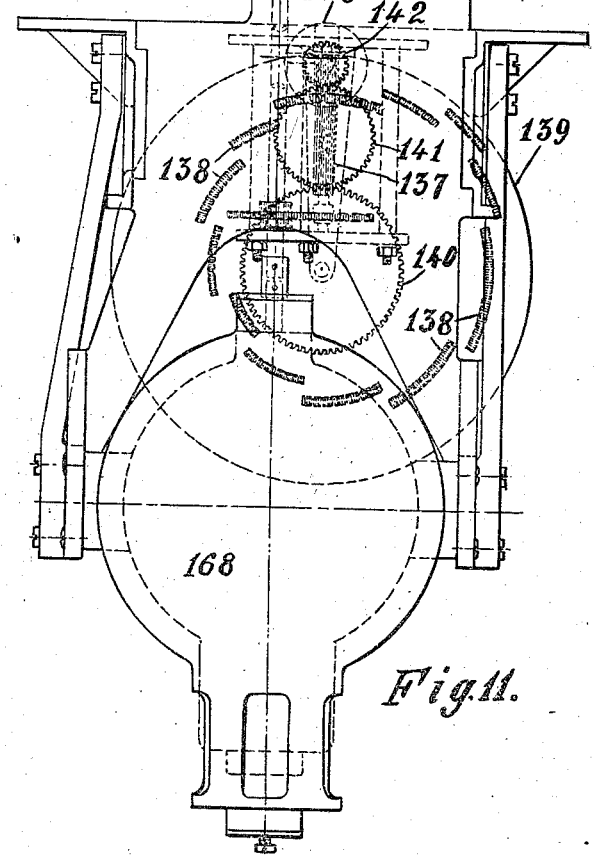

F. SPALAZZI.
TACTICAL NAVAL TRACER.
APPLICATION FILED JUNE 17, 1911.
1,084,907.
Patented Jan. 20, 1914.
11 SHEETS—SHEET
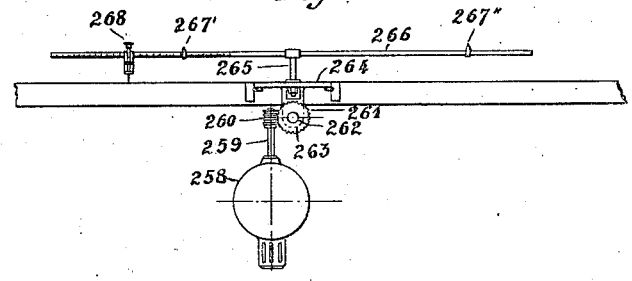
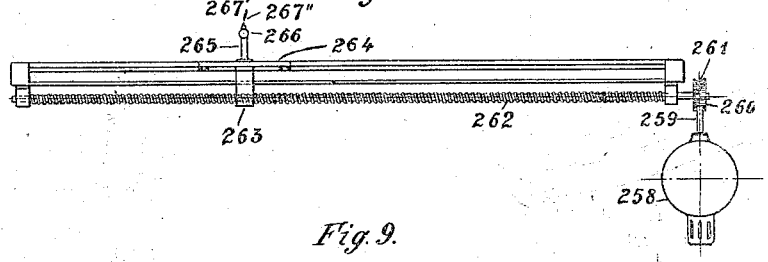
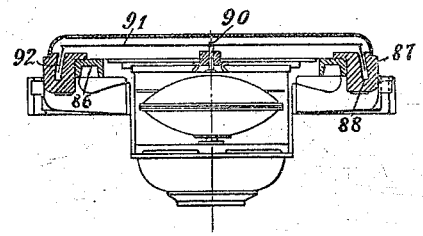
WITNESSES:
John H. Hoving
F. H. Loga
INVENTOR:
FRANCESCO SPALAZZI
By H. van Oldenmel
Attorney

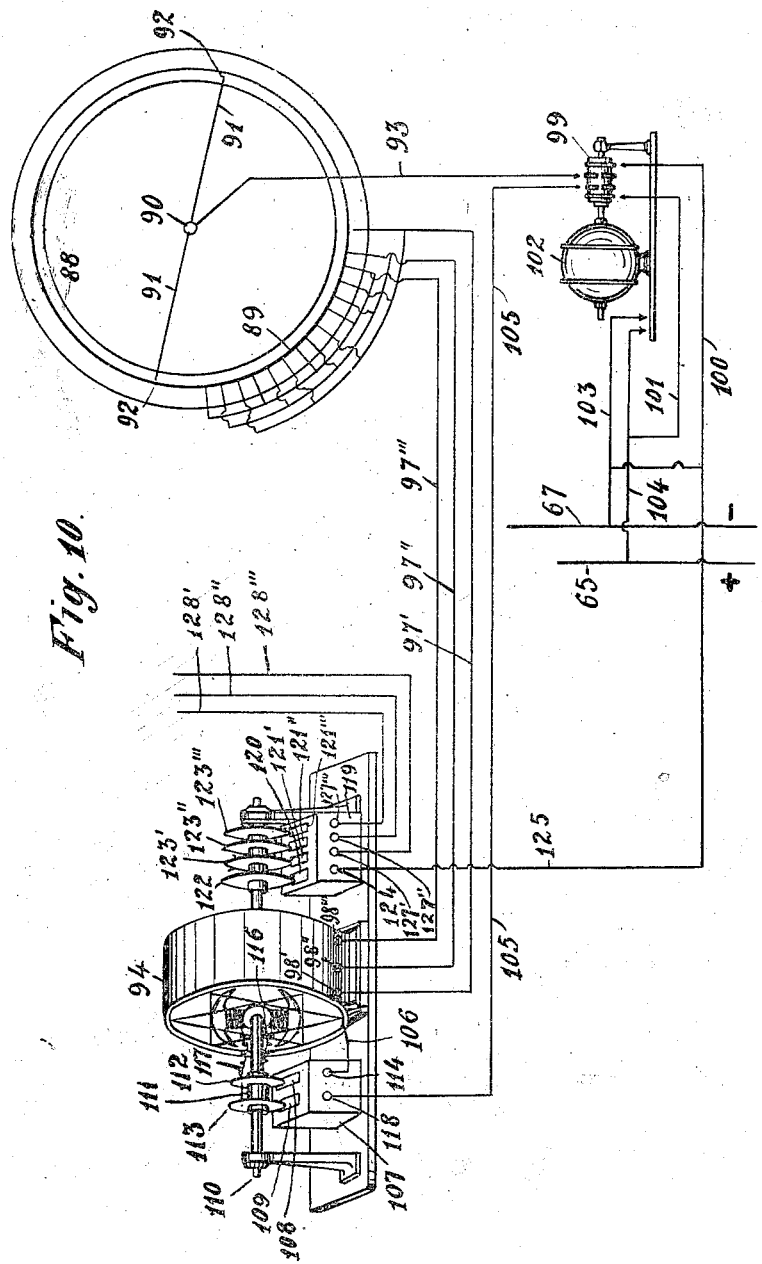

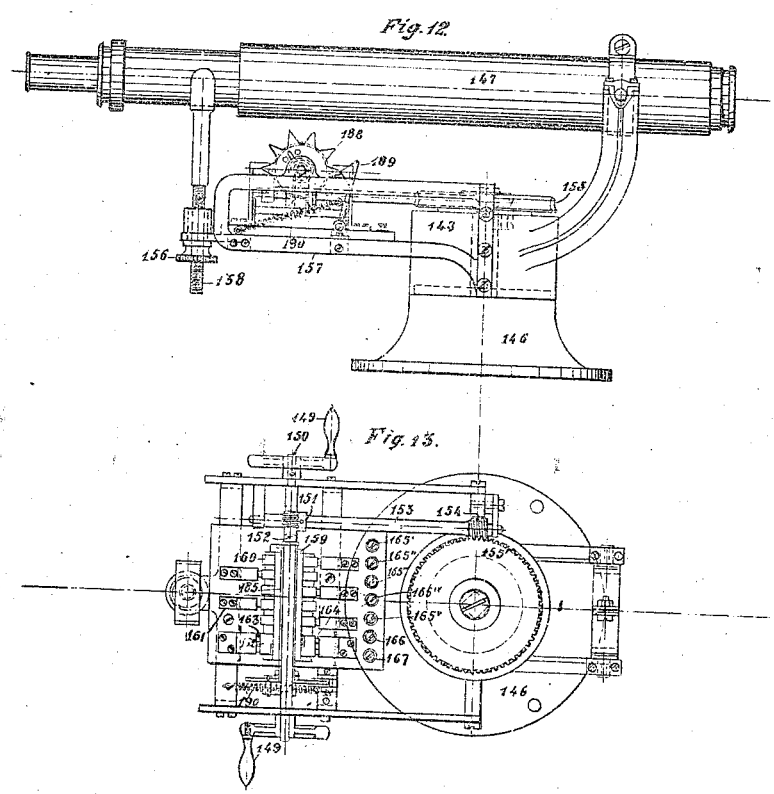

F. SPALAZZI.
TACTICAL NAVAL TRACER.
APPLICATION FILED JUNE 17, 1911.
1,084,907.
Patented Jan. 20, 1914.
11 SHEETS—SHEET 10.
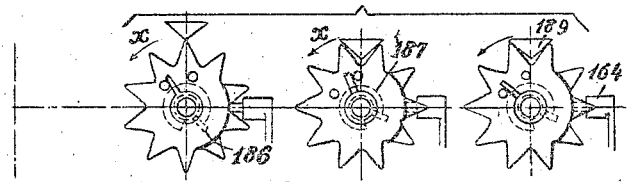
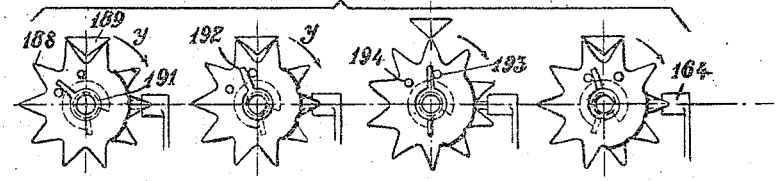
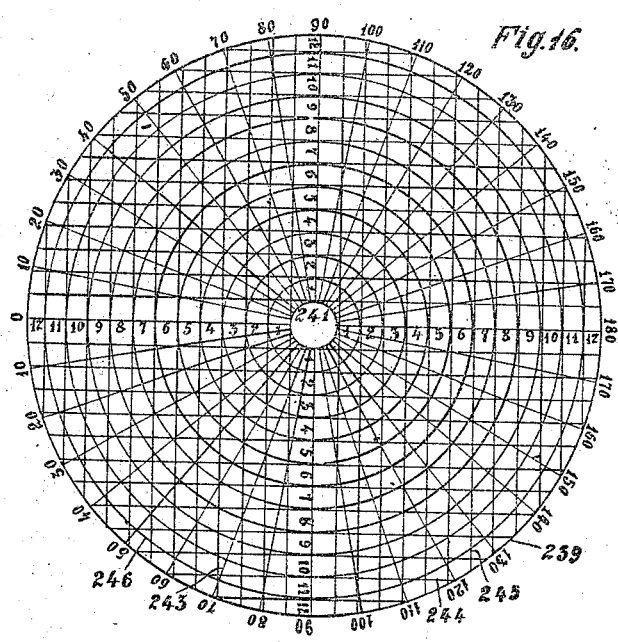
WITNESSES:
INVENTOR:
FRANCESCO SPALAZZI

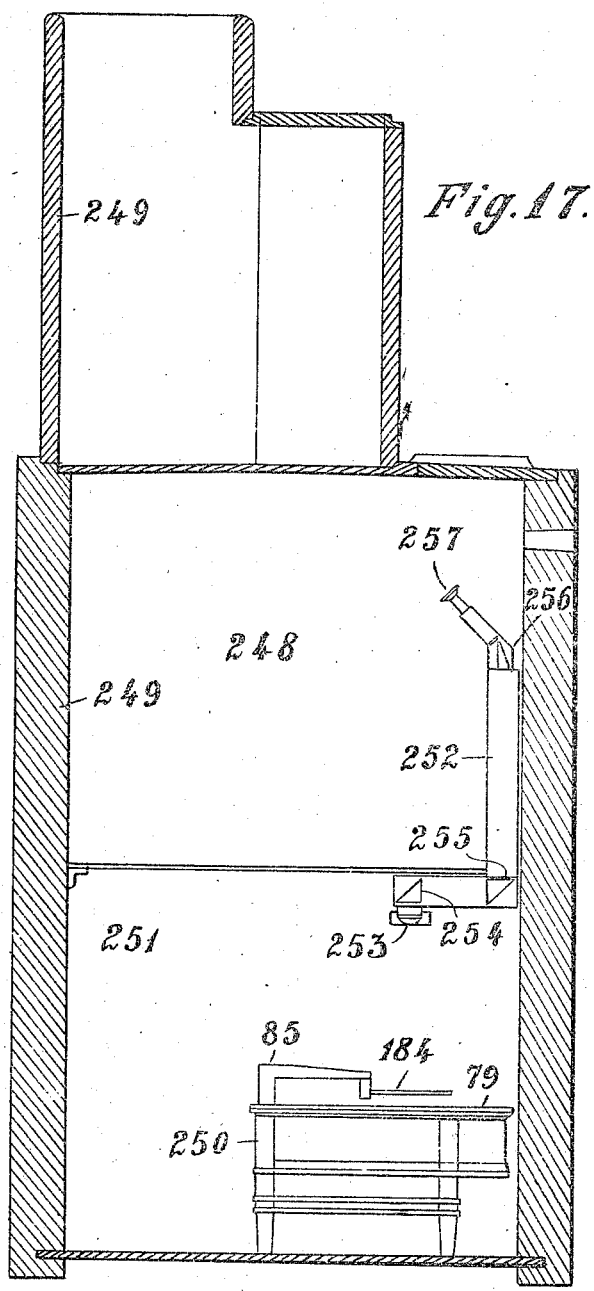

UNITED STATES PATENT OFFICE.

FRANCESCO SPALAZZI, OF ROME, ITALY.

TACTICAL NAVAL TRACER.

1,084,907.

Specification of Letters Patent.

Patented Jan. 20, 1914.

Application filed June 17, 1911. Serial No. 633,795.

*To all whom it may concern:*

Be it known that I, FRANCESCO SPALAZZI, lieutenant in the Italian Royal Navy, a subject of the King of Italy, residing at Rome, in the Kingdom of Italy, have invented certain new and useful improvements in tactical naval tracers—viz., apparatus for automatically and contemporaneously recording the course of the ship on which it is mounted and of an enemy's ship—of which the following is a specification.

The present invention refers to an apparatus which during the travel of the ship, on which it is mounted, records automatically the course of same upon a drawing sheet, or, after a convenient scale having been chosen, even directly on a sea chart, and at the same time on the same sheet and at the same scale it records the course of an enemy's ship, the evolutions and positions of which are thus continuously registered and immediately made apparent. To perform this duty the recording apparatus, which can be mounted on any point of the ship and preferably in the conning tower on one side is connected with the shaft, or the shafts, of the propelling mechanism, which transmits the indication of the travel made, on the other side with the compass which transmits to it the indication of the true course and lastly with a rangefinder, which transmits to it the indication of the distance and of the course of the enemy's ship watched. As in the apparatus according to the present invention the way made is figured out from the number of the revolutions of the propellers, devices must be provided which, even when through varying of the speed the number of the revolutions corresponding to a given length of way is varied, cause the apparatus to indicate always the exact way made, whatever may be the speed of the ship, moreover as when starting or stopping or otherwise changing the speed the inertia of the ship must be taken into consideration in order to get the true distance corresponding to a given number of revolutions of the propeller, the apparatus is provided with various devices which allow a compensation of these irregularities. Moreover, as the orientation required is the true one, also the compass is provided with devices for correcting the magnetic course of the deviations produced by the iron on board, and for directly obtaining the true course.

Therefore, the whole apparatus consists of: (a) an indicating device of the way made, deducted from the number of revolutions of the propeller shaft; (b) an interpolating device for automatically correcting the ratio of transmission in the indicator of the way made in order to keep the displacement of the drawing sheet always in correspondence to the real travel of the ship, whatever may be her speed; (c) a compensating device for eliminating in the indication of the way made the errors due to the action of the inertia during the variable motion of the ship; (d) a device for automatically transmitting at a distance the angles, by which deviates the compass needle; (e) a reducing device for automatically varying the value of the angles transmitted by the compass for the purpose of correcting the error produced by the iron on board; (f) a recording apparatus which produces also the movement of the drawing sheet; (g) a device for transmitting at a distance the angles under which the enemy's ship is watched and her distance; (h) lastly, if the recording device on account of lack of space cannot be placed in proximity of the commander, who must be placed in position of constantly seeing the indications given by it, also suitable means for rendering easily visible the tracings and the other indications, which can be obtained by the apparatus, are to be provided.

The recording of the ship's course takes place in the following way: The drawing sheet, placed upon the desk of the recording device, by the writing roller, which traces the way made by the ship, and which is connected to the device for indicating the way, is caused to advance by lengths proportional to the distances actually made, and in such a way that the position of the writing roller always corresponds exactly to the position of the ship. The drawing sheet can rotate around the said point and its rotation is produced by the device which transmits the indications of the compass duly corrected of all the errors, so that the sheet always keeps the same orientation during the travel of the ship and the line representing the course always advances on the sheet in the direction in which the ship is moving. An arm turning around an axis passing at the point of contact of the writing roller carries a movable block which runs along the said arm and is kept at a distance from the axis of rotation corresponding to the distance of the enemy's ship, while the arm turns keeping itself always orientated in such a way as to be turned toward the same. The sliding block carries a writing point which, at regular intervals, is lowered on the sheet and marks a point which indicates the position of the ship watched. Another writing point at the same intervals marks dots on the line which represents the way of the ship, and from the distance between said dots and said points, by means of indications provided on the desk surface and upon a disk carried by the sliding block, the following elements can be computed: angle under which the enemy observes the ship; course and speed of the enemy's ship; inclination of the armor plates of the enemy to the shots; lateral displacement viz. relative speed projected on a plan normal to that of the shots; variation of the distance in a given interval of time; angle between the true directions of the two courses; true course of the ship. Moreover through the graphic the distance between the two ships, the course of the own ship and the angle under which the enemy's ship is seen can be ascertained.

Considering the difficulty of ascertaining the movements which a ship performs at a distance at which nowadays the naval actions take place, and considering the special trim of the ships during the battle, and the difficulty met by an observer being on board a moving ship to perceive the absolute motion, it will be easily understood that the elements obtained by means of said apparatus facilitate the task of a ship in the presence of hostile craft and even of a squadron by watching the regulating ship, for the evolutions of the enemy's ship can be established therewith, and on the ground of the indications obtained the evolutions of the own ship can be rectified and regulated.

The above mentioned apparatus is also of considerable help in maintaining tactic positions for the concentration of the offense, for performing the evolutions in approaching or moving away, whereby the enemy is always kept under the greatest offense, and for the complete development of the action. Moreover with the said apparatus important indications for directing the shots at a great distance are obtained, namely, as already stated, the lateral displacement and variation of the distance of the aim, and the inclination of the armor plates on the direction of the shots.

The graphic of the course indicates the true orientation and helps also in keeping in mind the direction of the wind and the position of the sun, the influence of which elements, as it is known, is to be taken into account during a tactic action.

In the annexed drawings a complete apparatus of this kind mounted on board a ship is shown by way of example.

Figure 1 shows diagrammatically the electric connection of the recording device with the compass, the propeller shaft and the range-finding post. Fig. 2 is a plan view of the speed indicator connected to one of the propeller shafts. Fig. 3 shows a vertical section of said device according to line X X of Fig. 2 and seen in the direction of the arrow α and comprising also the connections with the propeller shaft. Fig. 4 shows a vertical elevation of the section according to line y y of the same device seen in the direction of the arrow 6. Figs. 5 and 6 are a plan view and a vertical elevation respectively of the desk with the recording apparatus. Figs. 7 and 8 are details of said device. Fig. 9 shows a diametrical section of the compass, Fig. 10 shows diagrammatically the device for transmitting at a distance the orientation of the compass. Fig. 11 shows on enlarged scale the compensating device for transforming the indications of the orientation of the compass in the indications of the true course. Figs. 12 and 13 are a plan view and an elevation respectively of the sighting device placed at the range-finding post which indicates the angle formed with the axis of the ship by the direction of the enemy's ship. Figs. 14 and 15 show some details of the switch of the motor connected with the telescope of the sighting device. Fig. 16 shows a disk carried by the sliding block of the recording device. Fig. 17 shows how the recording device is mounted in the conning tower of a warship, so as to enable the commander to have before him its indications. Figs. 18 and 19 are a front elevation and a side elevation respectively of a simplified device for tracing the course of a ship watched.

The propeller shaft —1—, Fig. 3, carries a toothed rim —2— which engages a wheel —3— loose on its axis —4—, on which is keyed a toothed wheel —5—. On this wheel travel two pawls —6— carried by the wheel —3— which cause the wheel —5—, and with it the shaft —4—, to revolve when the shaft of the screw turns in the forward direction, but when the ship is running backward they slide without acting upon the wheel —5— leaving thus immovable the shaft —4—. The shaft —4—, besides the toothed wheel —5—, carries also an ordinary toothed wheel —7— which engages with the first toothed wheel —8—, Figs. 2 and 3, of the indicating device of the way made. The wheel —8— engages with a wheel —9— keyed on a sleeve —10—, which also carries a cylindrical wheel —11— and a conical pinion —12— and is loose on a shaft —27—. The wheel —11— engages a second wheel —13— carried by a shaft —14— and provided with a projecting pin —15—. This pin —15— at each revolution of the wheel —13— strikes against a lever —16— rocking around an axis —17— and causes the same to swing by a certain angle in the direction of the movement of the wheel, shown by the arrow z. By means of a loose sleeve mounted on the shaft —17—, to the lever —16— is connected an arm —18— which through the action of an antagonistic spring —20— acting on the lever —16— rests against a cam —19—. The position of the lever —16— is controlled by the cam —19— and it will be understood that the more the lever —16— is displaced in the direction of the arrow z the smaller will be the angle of oscillation which it performs at the passage of the pin —15—. Now the lever —16— carries a pawl —21— which slides on the range of teeth of a ratchet wheel —22—. The shaft —17—, on which the toothed wheel —22— is mounted, carries a cylindrical wheel —23— which engages with a second cylindrical wheel —24— carried by a sleeve —25— which carries also a conical pinion —26—. The sleeve —25— is loose on the shaft —27— which carries an arm —28— on which another conical pinion —29— is loose, which can turn between the two pinions —12— and —26—. The diameters of the three pinions —12— —26—29— are equal and, therefore, if to the wheel —24— is not imparted any movement and the pinion —26— has been stopped, the coil —29— turns on the said wheel and at each complete revolution made by the pinion —12— it causes the arm —28— and with it the shaft —27— to perform half a revolution. Thus when the wheel —24— turns in one or in the other direction, on the shaft —27— in one case the semi-difference and in the other case the semi-sum of the two rotary motions is transmitted. A pawl sliding on the wheel —22— prevents the backward motion of same during the return movement of the pawl —21—.

As already told, the angle by which the wheel —24— advances, is controlled by the width of the oscillation of the lever —16—, viz. by the position of the cam —19—. Now the cam —19— is in turn controlled by a centrifugal governor according to the speed of the propeller shaft and in the drawing is shown by way of example the centrifugal governor hereinafter described. Inside a box —30— are located two horizontal rods —31— along which can slide two heavy masses —32— which by means of spiral springs —33— wound around the rods —31— are pushed toward the center of the box. The masses —32— are stuck upon two inclined arms —34— of a turning shaft —35— sliding in vertical direction in a sleeve which carries a helical wheel —36—, which engages with another helical wheel —37—, mounted upon the shaft —14—. When the speed increases, the masses —32— tend to move away from the center thus compelling the inclined arms —34— to slide downward whereby the shaft —35— is lowered. The shaft —35— at its lower portion carries a tooth rack which engages with a toothed wheel —39—, meshing with a pinion —40— connected with the cam —19—. In this way the position of the cam —19— varies when the speed of the propeller shaft is varying and, therefore, at the varying of this speed varies also the speed of the conical pinion —26—. The aim of this device is the following: As it is known, the relation between the speed per hour $v$ of a ship and the number of revolutions $n$ of her screws is expressed by the equation $$v = k.n$$

where $k$ is a numerical coefficient, which generally varies with the speed of the ship, so that to the different speeds which a ship can assume, to the same number of revolutions of the screws, correspond different distances made. Now, as in the device according to the present invention the displacement of the sheet, which corresponds to the distance made by the ship, is regulated the number of revolutions of the screws, it is clear that in order to maintain the proportion between the displacement of the sheet and the distance really made, at the varying of the speed it is necessary to vary the ratio of transmission between the driving shaft and the device producing the advancement of the sheet. This duty is intrusted to the cam —19— which regulates the stroke of the lever —16—. In fact things need only be arranged in such a way that for a certain speed the lever —16— is not met by the pin —15—; the shaft —27— moves then performing a number of revolutions which is half that of the revolutions made by the sleeve —10—. Then when the speed is gradually increasing, the shaft —35— slides downward, turns the cam —19— and puts into action the lever —16—, which causes the wheel —24— to revolve and produces the necessary correction in the ratio of transmission.

The interpolating device above described for correcting the ratio of transmission of the speed of the propeller shaft can also be usefully applied in other cases. If, for instance, the distance is to be transmitted to the guns of a ship and it is the case of guns having a different caliber, whereby for a certain caliber a given sight according to the distance ascertained is employed, while in the case of guns of different caliber a correction depending upon the difference of their caliber is to be made to the distance, it will be sufficient to transmit from a central point the movement regulated according to the distance which indicates the sight for a gun of a certain caliber, provided that the receiving apparatus of the distances for each gun be provided with a device like that described, having a sleeve —10— which repeats the number of revolutions of the central transmitting device, and a wheel —24— which carries out a correction proportional to the number of revolutions performed by the sleeve —10— and which can be varied according to the caliber of the gun on which the transmitting device of the commands is regulated. In this way on the shaft —27— the corrected number of revolutions establishing the distance, which is to be used by each caliber, is obtained.

The shaft —27— carries a toothed wheel —41—, Fig. 4, which engages with another toothed wheel —42— connected with a small pinion —43— which engages with a toothed rim —44— provided outside a box —45—. In the said box —45— is located a spiral spring fixed with one end at the periphery of the box and with the other end at the pivot —46— around which the box is turning. The pivot —46— as well as the pivot which supports the wheel —42— and the pinion —43— are fixed on one of the spokes of a fly-wheel —47—, which has projecting blades and is carried by the shaft —48—. It will be understood that when the spring inside the box —45— is not yet stretched, at the beginning of the revolution of the propeller shaft and while the ship by her inertia resists to the impulse directed to accelerate her speed, the box —45— revolves rolling up the spring, so that the fly-wheel —47— does not rotate by the same angle. As the movement of the fly-wheel is retarded by its inertia and through the resistance, which meet the blades provided on its periphery (Fig. 4) the spring, in order to be able to carry it has to stretch itself and at the point, which corresponds to the moment in which the ship has reached her uniform speed, also the rotation of the fly-wheel becomes uniform and synchronous with the rotation of the shaft —27—. Inversely, when the engine is stopped the fly-wheel keeps on moving farther to unwind the spring contained in the box —46—, indicating thus the exceeding distance made by the ship through her inertia.

On the sleeve —48— of the fly-wheel —47— is mounted a cam —49— which at each revolution of the fly-wheel rocks a lever —50—, to which is hinged an arm —51— which causes a lantern-wheel —52— to revolve a tooth. A pawl —53— prevents the lantern-wheel to turn backward when the arm —51— performs its backward stroke. The lantern-wheel —52— is mounted on the shaft —54— of a switch sending the current to the motor, which in the tracing device drives the sheet carrier for indicating the distance made.

The rotating switch for the transmission as well as the repeating motor can be of any convenient construction chosen among those already adopted in devices for transmitting angular movements at a distance. In the drawing by way of example are shown a switch and a motor of the class described in the British Patent No. 11,338—1909.

The switch, Figs. 1 and 2, consists of an insulating cylinder —55—, on which is located a ring formed by three insulating segments —56'—56''—56'''— and three continuous rings —57'—57''—57'''— which communicate with the three segments of the first ring. The current arrives through two brushes —58— which according to the position of the cylinder —55— are in contact with one or two of the segments —56— communicating thus with one or two of the rings —57—. Against each of these rings slides a brush —59'—59''—59'''—, from which starts a wire —60'—60''—60'''— leading to one of the windings —61'—61''—61'''— of the armature of the motor —62—, Figs. 5 and 6, placed on the desk of the tracing device and which has an armature having the iron outside and three windings. The return takes place through the brushes —63— at 180° from the first and which are in contact with that or with those of the segments of the ring, which are not in contact with the brushes —58—.

The brushes —58— receive the current from a wire —64— which ends at one of the conductors —65— of the main line and the return of the current from the brushes —63— takes place by means of another wire —66— ending at the second conductor —67— of the main line. From the conductor —65— of the main line starts also the wire —68— which leads the current to the windings —69'—69''— of the field of the same motor —62—. The return is made through the wire —70— which ends at the conductor —67—. The wires —64—60'—60''—60'''—66— end at the terminals —71—72'—72''—72'''—73— provided at the base of the switch, Fig. 2.

On the shaft —75— of the motor —62— is an endless screw —76— which engages a worm-wheel —77— connected with a drum —78— located under the plane —79— of the table of the tracing device. Against the drum —78— rests pressed elastically, a writing roller —80— which takes the ink from an inking roller —81— carried together with the roller —80— by a support —82— hinged to a bracket —83— which projects laterally from a vertical shaft —84— carried by fixed arm —85— which extends over the table. The spring joint of the support —82— causes the writing roller —80— to always rest with the due pressure on the sheet placed between it and the carrying drum —78—, in order to cause the sheet to move forward by distances equal to the development of the periphery of the drum —78— when revolving. In this way is obtained the forward motion of the sheet corresponding to the distance made by the ship but it is necessary that the sheet keeps its orientation in the space viz. that it deviates with respect to the ship by equal angles and in opposite direction to those by which deviates the ship when changing her course.

The device for automatically transmitting the direction of the course can work in connection with a compass of any kind and, therefore, it is to be understood that the compass shown in the drawing, Figs. 9 and 10, is only given by way of example.

The upper edge of the mortar —86— of the compass carries a collar —87— of insulating material, in which collar a deep annular groove —88— is provided; platen tips or plates —89— passing through the walls of the collar reach inside the same the surface of the channel —88—, which is filled with a liquid having little conductivity, for instance water with some drops of sulfuric acid. The platen plates or tips —89— are located all around at angular intervals equal between each other and at a distance of a few degrees.

In the center of the swimmer of the compass a vertical axis —90— is provided which supports an arm —91—. At its two ends the arm —91— carries two tips —92— which dip into the annular groove —88— without touching the walls, and for this purpose, as it is shown in the drawing, the walls of the groove are formed by two zones of spherical concentric surfaces having their common center on the axis of the shaft —90—, and the tips —92—, instead of being straight, are curved as arcs struck from the center of the sphere, so that, even when oscillating in vertical direction, the two tips always maintain the same distance of the two walls of the channel and their immersion is constant. The arm —91— is in electrical communication with the shaft —90— which receives the current through the wire —93—.

The platen plates —89— are electrically connected with the coils of a relay motor —94— in the way shown in Fig. 10 and in the scheme of Fig. 1; this motor has an armature with two pole-shoes, the windings —95'—95''— of which are in series with the windings —96'—96''—96'''— of the field. These windings are three and are connected to the plates —89— of the compass by means of the three wires —97'—97''—97'''—. The whole number of the plates must be a multiple of the double amount of the number of the windings, in the present case a multiple of 6, for instance $6n$; in this way, if the plates are divided in 3 groups of $2n$ plates each, giving each plate a progressive number and placing in one group the plates, the serial of which is expressed by $1+3m$, in another group the plates, the serial of which is expressed by $2+3m$, and in a third group the plates, the serial of which is expressed by $3+3m$, it results that the plates distant 180° from each other belong to the same group, viz. both of them are contemporaneously opposite the tips —92— carried by the arm —91—.

Now it is clear that, if the plates of the first group are connected to the wire —97'—, the plates of the second group to the wire —97''—, and the plates of the third group to the wire —97'''—, by turning the arm —91—, so that the tips depending from it and dipping into the liquid pass from one plate to the other, currents of variable strength are produced in the two windings fed by the wires connected to the two couples of plates, between which are the tips —92—; the current in a winding reaches the highest effect when the tips —92— place themselves opposite a couple of plates of the same group and diminishes little by little as soon as the tips start moving away and approach the couple of successive plates. In this way when rotating the arm —91—, the resultant of the flux between two successive windings rotates in the same direction causing the armature of the motor to rotate by an equal angle.

The current, which is caused to circulate in the windings, is an alternating current, as otherwise it would produce the electrolytic decomposition of the liquid contained in the groove —88— and would also cause the compass to deviate. If it is not possible to get alternating current the continuous current supplied in any way by the main line, with a suitable inverter can be transformed, for instance by adopting the arrangement shown in Fig. 10. Between the two wires —65—67— of the main line is interposed in shunt a current inverter —99— which by means of two branches —100—101— communicate with the two conductors of the main line.

The inverter —99— is driven by a motor —102— which with two wires —103—104— is shunted between the wires —101—100— from the inverter —99— and the wire —105— and which forms the return wire of the motor —94—. In the motor the current, which arrives from one or from two of the wires —97'—97''—97'''—, after having circulated in one or two of the windings —96'—96''—96'''— of the field, through the wire —106— reaches the windings —95'—95''— of the rotating armature. As the currents feeding this motor are very weak, in order to diminish the resistance mercury contacts arranged as shown in Fig. 10 are made use of. A block —107— is provided with two tanks —108—109— filled with mercury. The shaft —110— of the armature carries an insulating sleeve —111— having two metallic disks —112—113— which with their edge dip in the mercury of the two tanks —109—108—. The terminal —114—, at which ends the wire —106—, communicates with the mercury of the tank —108— and therefore with the disk —112— which by means of the wire —116— sends the current to the windings of the armature. The current returns through the wire —117— which ends at the disk —113— and passing through the mercury of the tank —108— arrives at the terminal —118— from which starts the return wire —105—. The motor —94— is designed to simply move the mercury contact switch which is seen on its right hand side. This switch consists in a supporting block —119— in which are provided four mercury tanks —120— 121'—121''—121'''—. In the mercury of said tanks dip a disk —122— and the metallic tips projecting from the periphery of other three disks —123'—123''—123'''— carried with the disk —122— by the shaft —110— of the armature. The metallic tips are three for each disk —123— and distanced from each other 120°, and every disk is rotated by 40° with respect to the next following so that in the mercury either one tip of a disk or two tips belonging to two disks are always dipping, but there are no moments in which no contacts are produced. In order to diminish the sparks upon the mercury, a little layer of water is immitted; with this layer of water a more uniform movement is obtained, because the water acts as a gradual resistance cut in before the current has been introduced in each one of the windings. The disk —122— having a whole edge dips constantly in the mercury of the tank —120— communicating with the terminal —124—, at which ends the wire —125—, which leads the current from the conductor —65— of the main line. The disk —122— by means of a conductor —126— located within the shaft —110— is electrically connected to the disks —123'—123''—123'''— and the mercury of the tanks corresponding to these three disks by means of the terminals —127'—127''—127'''— projecting in it communicates with the wires —128'—128''—128'''— which end at three windings of the armature —129'—129''—129'''— of a motor —130—, Fig. 6, similar to the motor —62— described hereinbefore, and which serves for repeating the angular movements of the compass. The windings —131'—131''— are in series with the windings of the armature and the return is made through the wire —132—. The motor —130— is located underneath the table of the tracing device and on the shaft —133— of same, Fig. 6, is mounted, a toothed pinion —134— which engages with a toothed wheel —135—. The toothed wheel —135— engages with a second toothed wheel —136—, the shaft of which carries a long grooved cylinder —137— which, being constantly in engagement with the segments of the toothed rim —139—, suitably disposed at the surface of a disk —139—, causes the latter to revolve with a speed depending upon the distance from the center of the toothed segment, with which it is engaged. The shaft of the disk —139— carries a wheel —140— which engages with a wheel —141— which by means of the toothed pinion —142— transmits the motion to a shaft which carries a deviating roller —143—. This roller is exactly located underneath the plane —79— of the table and touches slightly the surface of same so that it comes into contact with the drawing sheet which is upon the plane of the table. The sheet by means of a pressing roller —144— carried by an arm —145— hinged to the bracket —83— projecting from the vertical shaft —84— is kept against the deviating roller.

The axis of rotation of the deviating roller —143— and of the pressing roller —144— are perpendicular to the axis of the carrying roller —77— and of the writing roller —80—. Besides that the pressure which the deviating roller —143— and the pressing roller —144— exert on the drawing sheet is so weak that it does not prevent the sheet from being drawn along by the carrying roller —78—. Therefore, it will be understood that when the deviating roller —143— stops and the ship moves maintaining the same rhomb, the sheet is drawn along by the carrying roller —78— and the roller —80— traces a straight line. But when the ship changes her course, and it turns therefore the deviating roller —143—, also the sheet turns, having the point of contact of the writing roller —80— as instantaneous center of rotation. If the ratio of transmission between the compass and the roller —143— is regulated in such a way that the developed length of the arc of the periphery of the roller —143—, by which the same has revolved, corresponds to the developed length of the arc of deviation of the compass measured upon a circle which has as radius the distance intervening between the points of contact with the sheet of the writing roller —80— and of the deviating roller —143—, the angle by which the sheet turns is exactly equal to the angle, by which the ship has rotated. However this angle must be the true angle corrected from the disturbing effects of the iron on board, and to operate this compensation is intended the transmitting device with variable ratio formed by the disk —139— with the grooved drum —137—.

In the surface of the disk —139— are traced concentric grooves in which can be inserted segments of toothed rims —138—. These segments have an extension corresponding to an angle, in which the variation of the value of the correction to be introduced in the indications of the compass can be practically neglected and the said segments of toothed rim are located in the grooves more or less far from the center, according as to whether the ratio of transmission is to be more or less reduced. Things are preferably disposed in such a way that the middle groove corresponds to the case in which no corrections are to be made in the indication of the compass. In this way is traced the course of the ship on which the apparatus is applied; the course of the enemy's ship watched is obtained by means of the device shown in Figs. 12, 13, 14, 15 which is placed at the telemetric post.

In Fig. 12 is shown in elevation mounted upon a pedestal —146— the telescope —147— which serves to find out the direction of the enemy's ship. The telescope is carried by a turning collar —148—, the rotation of which is obtained by turning two cranks —149—, the common shaft —150— of which carries an endless screw —151— which, engaging with a worm wheel —152—, causes a shaft —153— to turn. Also the shaft —153— carries an endless screw —154— which engages with a worm wheel —155— fixed at the pedestal —146—. The angle of inclination of the telescope is regulated through a button —156— fixed at the bracket —157— which sustains the telescope; within this button passes a threaded stud —158— hinged with a clip to the body of the telescope. As it will be seen, the ratio of reduction of the movement of the cranks —149— to the wheel —155— is very great, in order to be able to establish with greatest exactness the angles of direction, because the switch which sends the current to the repeating motor of the angular deviations is directly acted upon by the cranks —149—. For the same purpose of securing greatest accuracy when establishing the angles of direction, instead of a motor with three windings, in this case a motor with five windings is made use of in order to avoid the increase of the number of revolutions of same, and for this reason the switch is formed by an insulating cylinder —159— on which are disposed five continuous rings —160'—160''—160'''—160''''—160'''''— against which rest five brushes —161'—161''—161'''—161''''—161'''''— and a ring —162— divided in five segments against which rest two brushes —163—164— at 180° from each other, and every continuous ring is in electric communication with one of the segments of the interrupted ring —162—. Therefore, there are seven terminals, five of which —165'—165''—165'''— 165''''—165'''''— are in communication with the brushes of the five continuous rings, and two, —166—167—, with the two brushes —163—164—.

From the first five terminals —165— go to the terminals of the motor —168—, Figs. 5 and 6, five wires —169'—169''—169'''— 169''''—169'''''—, at the terminal —166— arrives the feeding wire —170— from the main line from which start two branches one —171— reaching the feeding brushes —163— and the other —172— carrying the current to the windings —173'—173''— of the motor; to the terminal —167— goes the return wire —174— which joins the return wire —175— of the brush —164— and the return wire —176— of the winding of the inductor. The motor —168—, with the exception of having five windings instead of three, is similar to the motors —62— and —130—.

The shaft —177— of the motor —168— which is placed within the arm —85— carries at its upper end an endless screw —178— which engages with a worm wheel —179— mounted upon another shaft —180— which also runs within the arm —85— and carries at its end another endless screw —181— which engages with a helical wheel —182— fixed on a sleeve —183— mounted loose on the shaft —84—. This sleeve carries the alidade —184—, which therefore rotates together with the telescope —147— and keeps itself always parallel to it, if the ratio of transmission has been suitably chosen.

Here attention is to be called to a peculiarity of the switch connected to the telescope —147—, which contributes to the regular working of the device. As it may happen that the movements of the telescope —147— are very slow and that the brushes therefore pass very slowly from one to the other of the segments of the ring —162—, at the said point a frequent sparking would be produced, which must be avoided. For this purpose an automatic snap catch is provided, which rapidly operates the passage of the brushes through the separating lines. The particulars of this device are shown in Figs. 14 and 15. The insulating cylinder —159— is mounted loose upon a hollow shaft —185— which is also loose on the shaft —150— and at one end carries a radial arm —186—. The insulating cylinder —159— carries a collar —187—, missing a sector and in the angle of the missing sector can move the arm —186—. At the other end the hollow shaft —185— carries a star wheel having 10 tips —188—; as soon as the star wheel, when turning, has reached the position shown at 1ª. in Fig. 15, a spring catch —189— having a triangular tooth acted upon by a spring —190—, is compelled by the spring to rapidly advance by half a tooth, in order to cause the tooth of the catch —189— to fall on the bottom of the space between two successive teeth. Assumed now that the star is in the first of the positions of Fig. 14; the shaft —150— at its end which passes through the star wheel carries a collar —191— having a radial arm —192—. On the same face of the star wheel, on which slides the arm —192— two projecting pivots —193—194— are provided which are disposed in such a way as to allow the arm —192— to perform an oscillation having the amplitude of half a tooth. When the rotation of the shaft starts in the direction of the arrow $y$, the star and the cylinder of the switch remain stationary and therefore the brush —164— rests constantly on the same segment of the ring —162—. When the rotation of the shaft —160— is continued and the radial arm —192— comes in contact with the pivot —193—, it causes the star wheel to rotate and the hollow shaft —185— by means of the arm —186— draws along the cylinder of the switch raising the spring catch —189—, and the segments of the ring —162— slide underneath the two brushes —163—164— up to the moment in which the wheel arrives in the third position of Fig. 14, in which the tooth —189— is seen on the tip of a tooth of the star wheel and the brush —164— is shown in the moment it reaches the end of one of the separations of the segments of the ring —162—. As soon as the star wheel advances, even by a small quantity, the spring —190— by withdrawing the snap catch causes the same to fall in the fourth position of Fig. 14, whereby the cylinder of the switch is rotated in such a way that the brushes immediately pass on the successive segments and in the meantime the arm —192— touches again the pivot —194— which was in the first positions of Fig. 14; whereafter the process is repeated and it will be seen that the switch stops until the shaft —150— has not performed a rotation for an angle equal to the amplitude of half a tooth and then it rotates together with the shaft for the length of half a tooth, and lastly snapping out suddenly it turns by another angle equal to the said amplitude.

In the case of the backward rotation, the phases of which are shown in Fig. 15, the device is in the fourth position of Fig. 14 in the moment in which this rotation starts, the arm —192— pushing against the pivot —194— causes the star wheel to rotate in the direction of the arrow $x$, Fig. 15, but not the cylinder of the switch, because during this movement the arm —185— which establishes the connection between the two pieces, moves away from one of the bearing faces of the shear of the collar. When things are in the first position of Fig. 15, the catch —189— is on the point to snap out and the arm —186— rests against the other face of the shear of the collar —187—, so that when the snapping out takes place, the star turns and with it turns also the cylinder —159— until it reaches the second position of Fig. 15. When the rotation is continuing in the direction of the arrow $x$, the arm —192— moves freely without moving the star wheel —188— until it has not reached the pivot —194—, as shown in the third position of Fig. 15. Only then moves the star wheel and with it the cylinder, because the arm —186— presses again against the collar of the cylinder and when the brush is on the point of meeting the line of separation between two successive segments of the ring —162—, the snapping out and the sudden rotation of the cylinder takes place. In this way the working by snapping out is obtained in both directions.

The device for transmitting the indication of the distances of the watched ship is quite similar to that described hereinbefore for transmitting the indications of the direction with the telescope —147—. There is the only difference that by turning the operating crank an indicator of the distances moves as far as to indicate a distance corresponding to that which an attendant reads in a telemeter and communicates at short intervals of time. The operating crank, either directly, or by means of a convenient transmission, causes the shaft —195—, Fig. 1, to rotate by a switch similar to those previously described, and comprising an insulating cylinder —196— having three continuous rings —197'—197''—197'''— and an interrupted ring —198— formed by three segments, each of which communicates electrically with one of the continuous rings. Three brushes —199'—199''—199'''— rest against the three continuous rings and two brushes —200—201— at 180° from each other rest against the not continuous ring.

By means of the brush —202— the current is sent from the conductor —65— of the main line to the brush —201—. The return, from the brush —200— to the conductor —67—, takes place through the wire —203—. From the brushes —199'—199''—199'''— start three wires —204'—204''—204'''— which go to the tracing device, ascend within the arm —85— and end at three brushes —205'—205''—205'''— mounted upon a bracket —206— and which rest against three rings —207'—207''—207'''— mounted upon the sleeve —183—. The rings —207'—207''—207'''— by means of the wires —208'—208''—208'''— communicate with the windings of the armature —209'—209''—209'''— of the motor —210— which is carried by the alidade —184— and is similar to the motor —62—. The windings —211'—211''— of the armature are excited independently through the wire —212— which from the conductor —65— of the main line goes to the brush —213—, which is also carried by the bracket —206— and rests against the ring —214— of the sleeve —183—. From the ring —214— a wire —215— goes to the windings —211'—211"— and the return takes place through the wire —216—, the ring —217— of the sleeve —183—, the brush —218— and the wire —219— which from the said brush leads to the conductor —67— of the main line. The shaft of the motor —210— runs within the alidade —184— and forms a long screw —220— which operates the displacement of the movable carriage —221— so as to bring it in a position corresponding to the distance of the watched ship.

The following device serves for indicating the position of the ship on the sheet, Fig. 7; the alidade —184— carries two electromagnets —222—, the pole-shoes —223— of which act against an armature —224— formed by an arm pivoted on the shaft —225— which runs inside the alidade —184— for the whole length of same and parallel to the screw —220—. The carriage —221— carries an arm —226— with a sleeve —227— sliding along the rod —225— but turning with it. When the electromagnets —222— are energized and attract their armature —224—, the rod —225— turns and at the same time causes the arm —226— to turn. The end of this arm carries a pin which enters the short forked arm —228— of an angle lever, the long arm —229— of which carries at its free end a writing point —230— inked by a roller —231—. The rotation which the lever —229— performs every time the electromagnets are excited, is such that the point —230— on the plane —79— of the table of the tracing device comes in contact with the drawing sheet.

For the excitation of the electromagnets —222—, Fig. 1, is provided a wire —232— which, starting from the conductor —65— of the main line, ends at a brush —233— of the bracket —206— which rests against a ring —234— of the sleeve —183—. From the ring —234— starts the wire —235— which ends at the feeding terminal of the electromagnets —222—; the return takes place through the wire —236— which joins to the return wire —216— of the windings of the inductor of the motor —210—, continuing in a common wire —237— as far as to reach the ring —217—. On the feeding wire —232—238— is inserted a clock which at determined regular intervals of time produces the instantaneous closure of the circuit. The slide —221— carries a disk —239— and a flat ruler —240— both of which are parallel with the plane of the table and nearly in contact with the drawing sheet without however touching it, in order to not hinder the movements of same.

The disk —239—, Figs. 16 and 5, is of transparent material, for instance of celluloid, and in the center it is provided with a hole —241— which thus leaves uncovered on the paper sheet the point which corresponds to the center of the disk. The straight line which joins the center of the disk to the point of contact of the writing roller —80— is parallel with the axis of the alidade —184—, so that the straight line, which joins the said two points, represents the direction in which the enemy's ship is seen. The point —230— strikes against the sheet, exactly in the center of the disk —239—, and thus indicates on this direction the point which corresponds to the distance of the ship, which is given by the position of the slide —221—. This distance can be read directly on the ruler —240— having a longitudinal slot —242— with a division in meter on which runs a pointer carried by the slide. On the disk —239— at equal angular intervals are traced rays —243—, in the drawing from 30° to 30°, and net-work with square meshes formed by a system of straight lines —244— parallel with the axis of the alidade, and by a system of straight lines —245— perpendicular to the first ones. On the disk are also concentric circles —246— all of them at equal distances from each other, the rays of which are distanced from each other 100 m. As the last point indicated by the point —230— is always in the center of the disk, to know the speed of the ship, it is only necessary to see, on which circle the previous point is, after having ascertained the interval of time which passes between one point and the other. The two systems of orthogonal lines allow to ascertain with the greatest facility the lateral displacement and the variation of distance for the same interval of time. The interval of time and the distance corresponding to the difference between the rays of two successive circles of the disk —239— are regulated in such a way that the speed can be obtained by simply reading without being necessary to make any calculation.

The watch —238—, which operates the point —230—, by means of an eccentric placed upon the shaft —220— acts also upon a writing point —247— which at the same intervals of time marks transversal dots on the continuous line traced by the roller —80— which represents the course of the proper ship. If a transparent drawing sheet is made use of, on which straight lines parallel to the direction of the meridian are traced, and on the table —79— with the center in the point of contact of the roller —80— a divided circle is traced in the same way as the circle —239—, with the same facility and rapidity also the elements of the motion of the proper ship can be ascertained. The use of these two circles allows of having in every moment and without any calculation all the elements necessary for steering the ship and directing the fire during the development of the action. It is important that these indications be continuously before the commander's eye, therefore, if in the conning tower —248— should be no room left for locating there the table —250— of the tracing device, the same can be placed in any other room —251— underneath the same, and in order to render visible the elements which are on the plane —79—, a telescope —252— is made use of, the objective glass —253— of which is disposed in such a way as to embrace in its field the whole drawing sheet, and then by eventually making use of deviating prisms —254—255—256—, the image is brought in front of the ocular —257— located in such a position as to be able to easily make the observations.

By compelling the ship to keep her proper course for a certain time, in order to be able to obtain only the course and the speed of the enemy's ship during that time, the apparatus described hereinbefore could be simplified, by doing away with the portion serving for transmitting the orientation of the compass, and by rendering movable along a straight line the tracing roller operated by the shaft of the propeller, as well as by making use of an alidade carried by the movable slide indicated in the device described hereinafter and shown in Figs. 18 and 19 in front elevation and in side elevation designed for finding out the position of the enemy's ship. From the said figures it will be seen that substantially it consists of a motor —258— which, with a suitable ratio of reduction repeats the number of the revolutions of a log or of the propeller shaft as described hereinbefore. The shaft —259— of this motor carries an endless screw —260— which engages with a wheel —261— keyed on a shaft —262— provided on its whole length with a thread of constant pitch. A sleeve —263— with female screw slides along the shaft —262— when the latter is turned and in its movement shifts a slide —264— which indicates the way made by the ship and the position of same, if the ship advances in a straight direction. Now, if on the slide —264— a vertical support —265— with a turning alidade —226— provided with two sights —267'—267"— and with a pointer —268— sliding along a divided portion of the alidade is applied, for tracing the course of the enemy's ship it will be sufficient that an observer by making use of the sights —267— maintains the alidade constantly directed on same while the trolley moves, and a second operator brings the sliding pointer —268— in the position corresponding to the distance ascertained by an attendant of the telemeter in the moment in which he is reading it, marking with the pointer a point on the drawing sheet.

Having now described by said invention I declare that what I claim is:

1. A tactical naval tracing device for automatically and contemporaneously recording the course of the ship, on which it is applied and of an enemy's ship, comprising: a device for transmitting at a distance the number of the revolutions of the propeller shaft corrected in such a way as to always be proportional to the way made, whatever may be the speed of the ship, which causes a carrying roller to perform a number of revolutions proportional to the distance made; a writing roller carried by an elastic arm and which rests against the sheet upon the carrying roller; a device for transmitting at a distance the orientation of the compass corrected of the errors due to the presence of the iron on board, which causes a deviating roller to rotate, against which the sheet is kept by a pressing roller lent against elastically by an angle proportional to the angle by which rotates the ship when changing her course; a device for transmitting from a telemeter post the direction and the position of an enemy's ship, acting upon an alidade with a carriage sliding upon the drawing sheet, which is orientated according to the direction of the sight line directed to the enemy's ship, while the carriage displaces itself taking up a position corresponding to the distance of the said ship, the whole being disposed in such a way that the drawing sheet is simply drawn along by the carrying roller acting in connection with the writing roller and slides between the deviating roller and the pressing roller, which remain inoperative when the ship advances maintaining the straight direction, while at every deviation in the course they cause the sheet to rotate around a contact point of the writing roller together with the carrying roller by an angle equal to the angle by which the ship deviates, whereby a writing point carried by the carriage sliding on the alidade is lowered on the sheet at regular intervals and traces the course of the enemy's ship.

2. In the automatic tracing device as described an interpolating device for maintaining the angular advancement of the carrying roller at every speed proportional to the way made, consisting in a gearing which causes the shaft of the switch to perform a number of revolutions proportional to the number of those performed by the propeller shaft and a correcting pawl to perform a periodical oscillating motion the amplitude of the oscillations of the pawl being regulated by a cam, the position of which is controlled by a centrifugal governor, so that the wheel, on which acts the said pawl, at the different speeds of the ship is displaced with a different speed and by means of a three wheel device operates a variation of the number of revolutions transmitted to the switch thus keeping the number of the revolutions proportional to the length of the way made.

3. In the automatic tracing device as described a device for compensating in the calculation of the way made the effects of the inertia during the change of the speed, consisting in a spring placed between the shaft of the gearing which repeats duly corrected in accordance with the speed the number of the revolutions performed by the propeller shaft and the shaft of the switch which transmits the current to the motor of the tracing device, which spring is calculated in such a way that, before the two shafts reach the synchronous motion, it unwinds and winds itself more or less, according to the greater or smaller speed at which the ship is moving, in order to take up the tension corresponding to the resistance produced by wings applied to the periphery of a fly-wheel of the shaft of the switch, so that, when the speed is varying, there is a retardation or an acceleration of the carrying roller sufficient to compensate the increase or the diminution of the way made according to a given number of revolutions through the effect of the resistance of inertia.

4. In the tracing device as described a relay placed between the switch controlled by the compass fed with weak currents and the device which moves the deviating roller, consisting in a motor for repeating at a distance angular movements fed by the currents coming from the compass, which through mercury contacts arrive at the windings of the movable portion, the shaft of the said movable portion carrying a switch for sending the currents to the motor which drives the deviating roller, also the said switch having mercury contacts for the purpose of reducing to a minimum the mechanical resistance of the system.

5. In the automatic tracing device as described a device for compensating the deviations of the compass due to the iron on board, transforming the magnetic course in a true course, consisting in a disk divided in concentric sectors and grooves, which under the action of the transmitting device of the orientation of the compass turns by an angle proportional to that by which turns the compass, in which disk segments of toothed rims are located in each sector in a groove more or less remote from the middle groove which corresponds to the absence of deviation, according to the value of the deviation in that sector, so that by transmitting the motion to the said disk by means of a grooved cylinder, which extends upon the whole width of the zone covered by the grooves, the angular rotation of this disk, which causes the deviating roller to move, is greater or smaller than that of the compass according to the sectors in which it takes place.

6. In the tracing device as described a device for transmitting at a distance the direction of the sight line to an enemy's ship, comprising: a telescope turning upon a support; a switch which sends the current to a motor for repeating at a distance angular movements, operated through the rotation of the telescope; an arm upon the table of the tracing device having a vertical shaft carrying a turning collar, to which is fixed an alidade with a transmission of gearings between said collar and the motor which repeats the angular movements of the telescope, so that the alidade maintains itself always parallel to the axis of the telescope.

7. In the automatic tracing device as described a device for transmitting to the tracing device the distance of the enemy's ship, consisting: in a switch located in a range-finding post; a motor for repeating angular movements at a distance operated by the said switch and located on the turning alidade of the tracing device; a carriage sliding along a shaft having an endless screw in the said alidade and moved by the said motor in such a way that the carriage travels as far as to reach a distance from the axis, around which rotates the alidade, which at the scale of the drawing corresponds to the distance at which the enemy's ship is observed.

8. In the automatic tracing device as described a device for marking on the tracings of the two courses points intercepting distances made in equal times consisting in a clock which at equal intervals of time energizes an electromagnet carried by the turning alidade; an armature for the said electromagnet connected to a shaft placed within the alidade and carrying an eccentric which causes a writing point to oscillate and mark a stroke on the course of the proper ship, and an arm which with a lever system disposed in the sliding carriage lowers a writing point which marks a point on the sheet which represents the true position of the enemy's ship.

9. In the automatic tracing device as described the use of a transparent disk carried by the sliding carriage, the center of which corresponds to the position of the enemy's ship watched and having traced equidistant concentric circles as well as rays at equal angular intervals and a network formed by two systems of straight lines orthogonal between each other which allow to ascertain in a ready and easy manner the speed, the position and the course of the enemy's ship, the angle under which the enemy is sighting the ship and the angle under which she offers herself to the fire, the lateral displacement and the variation of the distance through the effect of the combined motion of the two ships and the orientation.

In testimony whereof, I have signed my name to this specification in the presence of two subscribing witnesses.

FRANCESCO SPALAZZI.

Witnesses:
 LETTERIO LABOCCETTA,
 ANTONINO LABOCCETTA.